United States Patent [19]

Kallenback et al.

[11] 4,440,893

[45] Apr. 3, 1984

[54] MOLDING OF POLYMERS

[75] Inventors: Lyle R. Kallenback; Faber B. Jones, both of Bartlesville, Okla.

[73] Assignee: Phillips Petroleum Company, Bartlesville, Okla.

[21] Appl. No.: 467,110

[22] Filed: Feb. 16, 1983

[51] Int. Cl.$^3$ ............................................... C08K 3/22
[52] U.S. Cl. ..................... 524/305; 524/359; 524/432; 524/433
[58] Field of Search ................ 524/432, 433, 305, 359

[56] References Cited

U.S. PATENT DOCUMENTS

| | | | |
|---|---|---|---|
| 3,214,422 | 10/1965 | Mageli et al. | 525/387 |
| 3,367,903 | 2/1968 | Deis et al. | 524/432 |
| 3,386,948 | 6/1968 | Needham et al. | 524/336 |
| 3,575,920 | 4/1971 | Ballini et al. | 524/432 |
| 3,876,613 | 4/1975 | Needham et al. | 524/307 |
| 3,980,629 | 9/1976 | Sacrini et al. | 524/432 |
| 4,029,729 | 6/1977 | Rees et al. | 264/310 |
| 4,115,508 | 9/1978 | Hughes | 264/310 |
| 4,214,030 | 7/1980 | Rakes et al. | 428/510 |
| 4,251,407 | 2/1981 | Schroeder et al. | 524/432 |
| 4,267,080 | 5/1981 | Yokoyama et al. | 525/194 |
| 4,273,691 | 6/1981 | MacLaury et al. | 106/18.11 |
| 4,292,106 | 9/1981 | Herschdorfer et al. | 156/244.24 |
| 4,301,063 | 11/1981 | Sowa | 525/387 |

*Primary Examiner*—Melvyn I. Marquis
*Assistant Examiner*—H. Lilling

[57] ABSTRACT

The incorporation of a metal oxide into a specific ethylene polymer-based molding composition reduces or eliminates the formation of bubbles during molding.

22 Claims, No Drawings

MOLDING OF POLYMERS

This invention relates to a novel polymer-based composition and to methods of molding the same. In one aspect, this invention relates to a polymer-based composition containing an organic peroxy compound and a metal oxide. In another aspect, this invention relates to the incorporation of a metal oxide into a cross-linkable polymer to reduce the formation of bubbles during molding.

BACKGROUND OF THE INVENTION

An article can be produced by molding a polymer into a desired shape or configuration. For example, large or thick hollow articles such as tanks, drums, containers, etc. can be manufactured by the rotational molding of polymers. Compression molding of polymers can be used to impart a desired pattern to a relatively bulky polymer mass.

Various compounds such as crosslinking agents or stabilizers can be added to polymers used in molding processes. These additives generally lend the polymer-based molding composition certain desired physical properties such as a high strength or resistivity to heat or light. Additives can, however, cause the formation of large bubbles in the molded article. The bubbles so formed can extend to each surface of the article and cause pinholes or openings in the wall of the article. A molded article can thus be rendered unsuitable for certain uses, such as storage of fluids.

Several compounds have been suggested in the art for addition to polymer-based molding compositions and molding processes to reduce the formation of bubbles. Many of these bubble inhibiting compounds adversely affect the molding process parameters such as cure rate, cure time, and the physical properties of the molded article, such as color, impact strength, and tensile strength.

THE INVENTION

It is thus one object of this invention to provide a polymer-based composition suitable for molding processes.

Another object of this invention is to provide a molding process for molding articles having no bubbles or a minimum of bubbles.

Still another object of this invention is to provide an inhibitor for a polymer-based molding composition which will reduce or prevent the formation of bubbles during molding, without adversely affecting molding process parameters or the physical properties of the molded product.

It has been discovered that the formation of bubbles in a molding composition based on a specific polymer to be defined can be prevented or substantially eliminated by incorporating a metal oxide into the molding composition. It has also been found that a molded article having no bubbles or a substantially reduced bubble content or having bubbles of reduced size can be produced by molding a composition comprising a substantially solid polymeric material, a peroxy additive, a metal oxide, and optionally, a stabilizer.

While it is not considered to limit the invention herein disclosed and claimed, it is believed that the mechanism of reduction of formation of bubbles by the use of a metal oxide in polymer-based molding involves, in part, the neutralization of decomposition products and/or impurities. Certain additives to polymer-based compositions, such as an organic peroxide used as a crosslinking agent, tend to decompose at an elevated temperature which may occur at molding conditions. The product or products of the decomposition of an additive may initially be acidic. An acidic product can volatilize and decompose to form offgases which in turn form bubbles in the polymeric molded article. The offgases at elevated temperatures apparently form small bubbles. These small bubbles can tend to expand during the heating and molding cycle into large, tear-shaped or round bubbles. The presence of a metal oxide in the molding composition can cause neutralization of an acidic decomposition product and can cause the formation of a non-volatile stable salt product. Since a volatile acidic decomposition product can be replaced by a non-volatile salt product by the action of a metal oxide, the formation of bubbles in the resulting molded article can be reduced.

Furthermore, water and/or other volatile impurities can be present in the polymeric molding composition. The addition of a metal oxide in the molding composition can effectively react with the water or other impurity and avoid the vaporization of the water or other impurity. As a result, fewer impurities and less water, etc., are vaporized and a reduced number of bubbles or no bubbles are found in the molded article.

Thus, in one embodiment of this invention, a polymer-based molding composition is provided. The composition of this invention, when used in a molding application, can produce a molded article having no bubbles or an article having a substantially reduced bubble content and/or bubbles of reduced size.

The present invention further is characterized by the use of polyolefins obtained in a solution polymerization process employing a chromium based catalyst, preferably a titanium free catalyst; the polymer contains less than about 50 ppm of ash, preferably 1 to 50 ppm, said ash being predominantly silicon oxide, and 0.1 to 5 ppm of chromium (measured as the metal), preferably 0.5 to 3 ppm of chromium. The so characterized polymers exhibit a certain amount of bubble formation when molded as a thermosetting peroxide containing composition. This amount of bubble formation in spite of being low (about 3-about 12 bubbles per 1000 $cm^2$) is intolerable; the inventive composition preferably achieves by using the metal oxide a reduction of bubble formation of at least about 80% and the product usually has less than 2 bubbles per 1000 $cm^2$. The bubble content is determined by counting the number of bubbles on a piece of rotomolded pipe of about ¾ inch wall thickness and about 550 $cm^2$ inner surface area.

Polymers used in molding compositions of this invention are polymers and copolymers of ethylene and acyclic mono-1-olefin hydrocarbons having 3 to 10 carbon atoms per molecule and are preferably linear, i.e. have essentially no other branching than that introduced by the monomer or monomer if any. Examples of polymers useful in this invention are polyethylene (ethylene homopolymer), polypropylene, poly-4-methyl-1-pentene, copolymers of 99.5 to 85 weight % ethylene and 0.5 to 15 weight % of another monoolefin, preferably an aliphatic monoolefin having 4 to 10 carbon atoms and in particular of those having 6 to 10 carbon atoms. Preferably, the 1-olefin is present as a comonomer in the range of about 1 to 8 parts by weight α-olefin comonomer to 100 parts by weight ethylene.

Ethylene polymers having a density in the range of about 0.91 to 0.97 g/cm³ and having a melt index in the range of about 0.01 to 25 g/10 min. extrusion at 190° C. using 2160 gram load as determined by ASTM D 1238, Condition E, are particularly preferred for use in a molding composition. The most preferred polymers are homopolymers of ethylene having a density in the range of about 0.95 to 0.97 g/cm³ and a melt index of at least 0.05 (g/10 min. extrusion).

Polymers employed in a molding process of this invention are preferably normally solid polymeric materials, that is, substantially solid at room temperature (about 25° C.). Polymers are most preferably employed in molding processes of this invention are those with which a peroxy additive such as a peroxy crosslinking or curing agent, stabilizer, etc. is used.

The most preferred polymer for use in a molding process of the present invention are homopolymers of ethylene, having a density in the range of about 0.95 to about 0.97 g/cm² and a melt index as previously defined of at least about 0.05. Ethylene homopolymers having a lower density and a lower melt index are also suitable for use in molding processes of this invention.

Preferably, the molding composition of this invention is thermosetting and/or contains one or more crosslinking agents. Crosslinking agents for molding composition of this invention preferably are organic peroxide compounds having at least one acetylenic unsaturation and one or more peroxy groups. The most preferred organic peroxy crosslinking agent is 2,5-dimethyl-2,5-di(tertiary-butyl peroxy)hexyne-3. A crosslinking agent can be present in the composition in a weight range of about 0.01 to 2.0 parts by weight crosslinking agent to 100 parts by weight polymer. Preferably, the crosslinking agent is present in the composition in a weight range of about 0.5–1.0 parts by weight crosslinking agent to 100 parts by weight polymer.

One or more stabilizers can be present in a molding composition of this invention. The stabilizer can be added to obtain a specific processing or in-use advantage such as heat, light, etc. stability. Dilauryl thiodipropionate and 2-hydroxy-4-n-octoxybenzophenone are preferred stabilizers for a molding composition of the present invention. Stabilizers can be present in a weight range of 0 to about 2 parts by weight stabilizer to 100 parts by weight polymer depending on the type, chemistry, and utility of the given stabilizer. For instance, dilauryl thiodipropionate is present preferably in a weight range of about 0.02–0.06 parts by weight dilauryl thiopropionate to 100 parts by weight polymer and 2-hydroxy-4-n-octoxybenzophenone is present in a weight range of about 0.25–0.75 parts by weight, 2-hydroxy-4-n-octoxybenzophenone to 100 parts by weight polymer.

A metal oxide serves as an inhibitor in accordance with this invention which prevents the formation of bubbles during molding. A metal oxide is thus an essential ingredient of a molding composition of this invention. Metal oxides useful in a molding composition include those oxides of metals found in Groups IIA and IIB of the Periodic Table (CRC Handbook of Chemistry and Physics, 49th Edition). The most preferred oxides are oxides of Group IIA metals. Examples of metal oxides useful in this invention are CaO, MgO, BaO, and ZnO. CaO is the presently most preferred metal oxide. The metal oxide is added to the polymer-based molding composition preferably as a dry, anhydrous powder.

The particle size of the metal oxide powder are selected to achieve an optimum distribution of the metal oxide essentially throughout the polymer composition. Particle sizes can range from about 0.1 to about 500 microns. Preferably the particle size of the metal oxide is less than 250 microns. Most preferably, the particle size is in the range of about 10 to 250 microns.

One or more metal oxides can be present in the polyolefin molding composition. The metal oxides can be present in the polymer in a concentration ranging from about 0.01 to 4 parts by weight total metal oxides to 100 parts by weight polymer. Metal oxides are preferably present in the polymer composition in a weight range of about 0.1 to 1 parts by weight total metal oxides to 100 parts by weight polymer. Most preferably metal oxides are present in a weight range of about 0.3 to 0.7 parts by weight total metal oxides to 100 parts by weight polymer.

Furthermore, metal oxides are present in a polymer-based molding composition containing a peroxy additive generally in a weight ratio of total metal oxides to total peroxide additives in the range of about 0.005 to about 400. Preferably, the weight ratio of total metal oxides to total peroxides is about 0.1 to 2.0.

Higher levels of a peroxide additive can thus be tolerated in a molding composition with a metal oxide present because the metal oxide is effective in eliminating bubbles in the molded article. For example, by adding a metal oxide to a thermosetting molding composition containing a peroxy crosslinking agent, one can use more peroxy crosslinking agent per unit weight of polymer and thus achieve a faster development of cure, impact strength, etc. via a more rapid and effective crosslinking, without causing a bubble problem in the molded product.

Table I below summarizes specific preferred embodiments of a molding composition of this invention.

TABLE I

|  | General Ranges Parts by Weight | Preferred Ranges Parts by Weight |
|---|---|---|
| Ethylene-based polymer or copolymer | 100 | 100 |
| Acetylenic peroxy additive | 0.01–2.0 | 0.5–1.0 |
| Metal Oxide (from Group IIA, or IIB of Periodic Table) | 0.01–4 | 0.01 to 1 |
| Stabilizer | 0–1 | 0–1 |
| (dilauryl thiodipropionate) | 0–1 | 0.02–0.06 |
| (2-hydroxy-4-n-octoxybenzophenone | 0–1 | 0.25–0.75 |

In another embodiment of this invention, a method of molding articles having no bubbles or having a reduced content and/or size of bubbles is provided by incorporating a metal oxide into a molding composition and molding the same. A molding process yielding articles having no bubbles or reduced content or size of bubbles can be obtained by molding a composition of matter comprising a substantially solid polymeric material, a peroxy additive, a metal oxide, and optionally, one or more stabilizers.

The terms "molding" or "molding processes" as used in the specification and the claims refer to molding, casting, extruding, spinning, etc. where a desired shape or configuration is substantially obtained prior to or at a time at which a polymer or polymers in a polymer-based molding composition become substantially unworkable, nonresponsive to mechanical attempts to substantially modify its physical characteristics at temperatures near ambient (about 25° C.), and/or substantially crosslinked and non-thermoplastic. This invention thus relates to processes for molding thermoplastic compositions. Preferably, however, thermosetting compositions are employed in molding processes of this invention. Rotational molding and compression molding are examples of molding processes preferred in this invention. In rotational molding, compression molding, etc., when an article is formed having a relatively thick wall or body, the probability of formation of bubbles can be high. The probability of formation of bubbles in the resulting molded article can increase as the concentration of a peroxy additive such as a peroxy crosslinking agent or stabilizer is increased. The bubbles so formed typically permeate from the internal surface of a molded article to an external surface of the article, especially where the molding process is operated under relatively severe conditions of temperature and pressure.

The term "rotational molding" as used in the specification and the claims refers to the molding of a molded article by use of a rotating mold. Preferably, a mold is used which has an internal shape or configuration substantially equivalent to the desired external shape or configuration or desired design of the article to be molded. The mold can be in one or more parts or units, such as a first portion or half and a second portion or half. Preferably, the mold has a first portion and a second portion which when joined form a complete mold, each portion can have an internal surface which is about one-half of the total external surface of the article to be molded. The mold can be constructed out of a suitable heat conducting material. Preferably, the mold is constructed of sheet or cast aluminum, sheet or cast iron, steel, nickel, copper, or alloys or combinations thereof.

In a rotational molding process of this invention, a predetermined amount of polymeric material is placed in the mold. The mold is preferably at room temperature when the polymeric material is introduced to it. Preferably, the polymeric material is substantially solid polymeric material at room temperature (about 15 to about 25° C.). The polymeric material which is added to the mold can be in flake, pellet, bead, ground form or powder form or the like. Preferably, the polymeric material has been ground to a particle size sufficiently small to pass through a 35 mesh Tyler screen.

Prior to adding the polymeric material to the mold, a mold release agent such as a silicone or fluorocarbon release agent can be applied to the internal surface of the mold.

The mold containing polymeric material is then placed in contact with a heating medium. The mold can be placed within a heating chamber such as an oven wherein the heating medium can be hot air, hot water, steam, hot heat transfer salt, or the like. The heating medium preferably heats the mold and/or the contents of the mold to the temperature of about 260° C. to about 370° C. Most preferably, the mold is heated to a temperature in the range of about 285° C. to about 330° C. The mold is preferably rotated at least a portion of the time that the mold is in contact with the heating medium. The mold can be rotated about one axis only. Preferably, however, the mold is rotated about at least two axes. Rotation about a second axis need not be perpendicular to rotation about a first axis and the rotation along each of two different axes need not be simultaneous. Preferably, the mold is simultaneously rotated about two perpendicular axes.

The mold can be positioned in contact with a rotating spindle means which can support and rotate the mold. The rotating spindle means comprises a shaft in communication with a power source. The mold can be positioned with or can be affixed to the shaft. The power source can turn the shaft which can in turn rotate the mold, in at least one direction.

The mold can be rotated in more than one direction by use of a multi-directional rotating spindle means. The following description relates to one type of multi-directional rotating spindle means and should not be read in an unduly limiting manner. The molding process of this invention is applicable to rotational molding regardless of the type of multi-directional rotating spindle use.

A rotating spindle means can comprise a first, second, and third shaft, a set of gears, a housing, and one or more power sources. The first shaft can be hollow along its longitudinal axis. The second shaft can be positioned in the hollow portion of the first shaft, in such manner that the second shaft can turn freely within the first shaft.

One end of the first shaft can be connected to a housing so that as the first shaft rotates, the housing also rotates. A set of gears such as a set of bevel gears can be positioned within the housing. One end of the second shaft can be connected to a first gear within the housing. One end of a third shaft can be connected to a second gear within the housing. The third shaft can extend through the housing and can be connected to the mold. Preferably, the third shaft extends through the housing perpendicular to the first and second shafts. As the second shaft and the first gear rotate, the second gear, third shaft, and mold also rotate.

The term "major axis" as used herein refers to the axis along which the first shaft, second shaft, housing, and mold rotate. The term "minor axis" as used herein refers to the axis along which the third shaft and mold rotate. Thus, the mold can rotate along both the major and the minor axis.

The first and the second shaft can be connected to a different power source or other power means whereby each shaft can be rotated at a different speed or for a different period of time.

The time and speed of rotation of a mold in a given direction during heating can be varied according to a specific mold shape, mold size, number of molds per spindle means, type of polymeric material used during molding, and the like. The mold is preferably heated for sufficient time to properly fuse the particles of the polymeric material. The mold is preferably rotated at a speed less than 50 rpm (revolutions per minute) and for a period of time less than one hour. Most preferably, the mold is rotated in any given direction at a speed in the range of about 15-25 rpm and for a period of time in the range of about 10-30 minutes.

A uniform or near uniform continuous deposit of polymeric material on the interior surface of a mold used in rotational molding can be achieved by rotating the mold in two directions simultaneously, while the mold is being heated. This multi-directional rotation can be achieved by use of a spindle means having more than one shaft, as described above.

It is preferred to rotate a mold at a different speed in each of two different directions along two perpendicular axes simultaneously. These can be selected to be sufficiently low to prevent generation of significant centrifugal forces that would cause the flow of polymeric material in the mold to a portion of the mold furthest from a given axis. If the mold is mounted such that the largest dimension of the article to be molded is parallel to the major axis, then the ratio of the speed of rotation of the major axis and the speed of rotation of the minor axis is preferably in the range of about 2.0–8.0 to 1.0, or most preferably, 3.25–4.25 to 1.0. If the mold is mounted so that the longest dimension of the article to be molded is parallel to the minor axis, then the ratio of the speed of rotation of the minor to major axis is preferably in the range of about 2.0–8.0 to 1.0, most preferably, 3.25–4.25 to 1.0.

After the mold has been heated for a sufficient period of time, the mold is then removed from contact with the heating medium and is cooled. Preferably, the mold is cooled to room temperature (about 15°–25° C.). The mold can be cooled while still rotating. A cooling medium such as a cool air, cool water, water spray, atomized air-water fog, or the like can be used, in one or more cooling steps. The mold is preferably cooled for a period of time sufficient to set or solidify the polymeric material within the mold which forms the molded article. After cooling, the molded article can be removed from the mold.

The term "compression molding" as used in the specification and the claims refers to the molding of a molded article wherein a sheet, slab, tube, or the like of a polymeric material is placed in contact with a mold surface having a shape or configuration substantially similar to the pattern desired and subjecting the polymeric material to conditions of temperature and pressure conducive to the transition of at least a portion of the polymeric material to a near amorphous state, such as a molten state. The polymeric material can then be shaped into a pattern which substantially reproduces the shape or configuration of the mold surface.

A peroxy additive which can be present or used in the molding process of this invention can include an organic peroxy compound regardless of function of the peroxy additive. A peroxy crosslinking agent, for example, can be present in a molding process of this invention. These can include those crosslinking compounds disclosed in U.S. Pat. No. 3,214,422, issued to Mageli et al, Oct. 26, 1965. Presently preferred peroxy compounds are acetylenic diperoxy compounds; these include hexynes having the formula:

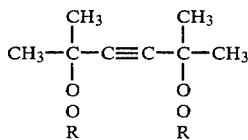

octynes having the formula

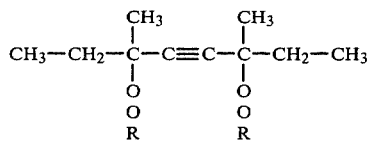

and octadiynes having the formula

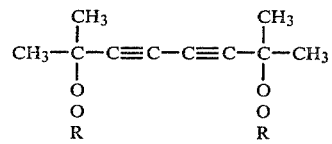

and wherein R is selected from the group consisting of tertiary alkyl, alkyl carbonate, and benzoate. In general, the molecular weights of the poly peroxides fall within the range of 230 to 550. Excellent results are achieved with the above-noted hexynes. Among the compounds encompassed within the above-noted hexynes, octynes and octadiynes are included:

2,7-dimethyl-2,7-di(t-butylperoxy)octadiyne-3,5
2,7-dimethyl-2,7-di(peroxy ethyl carbonate)octadiyne-3,5
3,6-dimethyl-3,6-di(peroxy ethyl carbonate)octyne-4
3,6-dimethyl-3,6-di(t-butylperoxy)octyne-4
2,5-dimethyl-2,5-di(peroxybenzoate)hexyne-3
2,5-dimethyl-2,5-di(peroxy-n-propyl carbonate)hexyne-3
2,5-dimethyl-2,5-di(peroxy isobutyl carbonate)hexyne-3
2,5-dimethyl-2,5-di(peroxy ethyl carbonate)hexyne-3
2,5-dimethyl-2,5-di(alpha-cumyl peroxy)hexyne-3
2,5-dimethyl-2,5-di(peroxy beta-chloroethyl carbonate)hexyne-3
2,5-dimethyl-2,5-di(t-butylperoxy)hexyne-3

The concentration of organic peroxide which can be present in a molding composition used in a molding process of this invention can vary significantly and can cover a broad range from about 0.01 to 10 or more parts by weight peroxy compound to 100 parts by weight polymer. If the peroxy compound is a crosslinking agent such as those described above, the concentration in the molding composition can range from about 0.01 to about 2 parts by weight peroxy crosslinking agent to 100 parts by weight polymer. Preferably, the peroxy crosslinking agent is present in a weight range of about 0.5 to 1 parts by weight peroxy crosslinking agent to 100 parts by weight polymer. In a molding process of this invention, the peroxy crosslinking agent is preferably 2,5-dimethyl-2,5-di(tert-butylperoxy)hexyne-3.

In one variation of this embodiment, a stabilizer is used in the molding process to lend a desired physical characteristic to the molded article so produced. A stabilizer of the present invention can be used to obtain a heat, light, etc., stability for the polymer-based molded article. Such stabilizers can include antioxidants such as amines, such as diphenylamine, phenyl-α-naphthylamine, phenyl-β-naphthylamine, diphenyl-p-phenylenediamine, N,N'-phenylcyclohexyl-p-phenylenediamine and N,N'-di-β-naphthyl-p-phenylenediamine; phenols, such as p-hydroxyphenylcyclohexane, di-p-hydroxyphenylcyclohexane, dicresylolpropane, 2,6-di-tert-butyl-p-cresol, 2,4,6-tri-tert-butylphenol, condensation products of dialkylphenols with formaldehyde, reaction products of phenol with styrene, 1,1'-methylene-bis-(4-hydroxy-3,5-tert-butylphenol), 2,2'-methylene-bis(4-methyl-6-tert-butylphenol), 2,6-(2-tert-butyl-4-methyl-6-methylphenyl)-p-cresol, phenylethylpyrocatechol, phenylisopropylpyrocatechol, 1,1,3-tris(2'-methyl-5'-t-butyl-4-hydroxy-phenyl)butane, 2,2-methylene-bis[6-(α-methylcyclohexyl)-4-methylphenol], 1,3,5-trimethyl-2,4,6-tris(3',5'-di-t-butyl-4-hydroxybenzyl)-benzene and α-naphthol; and sulfur containing compounds such as 2,2'-thio-bis-(4-methyl-6-tert-butylphenol), 4,4'-thio-bis-(3-methyl-6-tert-butylphenol), thio-bis(β-naphthol), thio-bis-(N-phenyl-β-naphthylamine), methylthio-2-naphthalene, diphenyl sulfide, diphenyl disulfide, 3-tolyl disulfide, 1-dodecyl disulfide, polymeric 1,10-decanedithiol, 2-toluene thiol, 2-naphthylthiol, mercaptobenzothiazole, 1-dodecyl mercaptan, phenyl benzyl sulfide, 2,2'-tert-butyl-4-methyl phenol sulfide, tetramethylthiurammonium sulfide, tetramethylthiuram disulfide, 2,2'-diphenyldiamine disulfide, 4,4'-diphenyldiamine disulfide, mercaptobenzimidazole, di-β-naphthyl sulfide, methyl-β-naphthyl sulfide, 2,2'-thio-bis-(4-methyl-6-tert-butyl phenol) and dilauryl thiodipropionate; and other compounds such as 2,6-di-tert-butyl-4-methylphenyl, esters of pyrocatecholophosphorus acid, phosphites of α-naphthol and pyrocatechol and carbon blacks.

Stabilizers also include all known ultraviolet stabilizers which are effective in polymer compositions. Such ultraviolet stabilizers include phenol-nickel complexes, phenyl and alkyl phenyl salicylates, benzotriazoles, dibenzoyl resorcinol, dialkylmethylene malononitriles, 2,4-dihydroxybenzophenone, 2-hydroxy-4-n-octoxybenzophenone, 2-hydroxy-4-methoxybenzophenone, 2,2',4,4'-tetrahydroxybenzophenone, and 2,2'-dihydroxy-4,4'-dimethoxybenzophenone, etc.

The preferred stabilizers which are employed in the molding processes of the present invention are dilauryl thiodipropionate and 2-hydroxy-4-n-octoxybenzophenone. The stabilizers are preferably employed in the concentrations and in the manner described and disclosed above in connection with the molding composition.

Combinations of several types of stabilizers disclosed above are within the scope of this invention. As discussed previously, each different stabilizer can be employed in a concentration range which is particularly optimum for that specific stabilizer.

Other additives such as plasticizers, fillers, pigments, lubricants, slip agents, modifiers, etc. are suitable for use in a polymer-base molding composition or process of this invention. The concentration of each additive present can depend upon what effect upon a molding process parameter or a physical property of a molded article is desired.

A polymer-based molding composition of the present invention can be employed in any form suitable for molding end use such as a pellet-, flake-, powder-, ground-form and the like.

Molding conditions employed in molding processes of this invention can be conventional molding conditions such as a molding temperature in the range of about 100° to 400° C. and a molding time of about 5 to 30 minutes. Specific conditions selected will of course depend upon melting temperature and decomposition temperature and degradation characteristics of the specific polymer employed. A minimum of bubble formation in and/or discoloration of a molded article produced by a molding process of this invention can be observed even at molding temperatures in excess of 300° C.

A molded article produced utilizing a molding composition of this invention and/or a molding process of this invention can have a wall or body of significantly increased thickness or depth over prior art processes. Wall thicknesses in excess of ½ inch (12.7 millimeters) can be produced without experiencing difficulty with bubble formation, even though longer heating periods during molding are typically required to form such thicker walls.

The following examples contain further preferred embodiments of this invention but should not be read in an unduly limiting manner.

EXAMPLE I

In this example, a polymer-based molding composition containing no metal oxide was tested as a control. This example describes a typical method for preparing molded articles from a polyolefin such as polyethylene. To a tumbler-type blender was added 50 pounds of polyethylene resin in pellet form (TR885 from Phillips Petroleum Company); a peroxy crosslinking agent, 0.325 pounds (0.64 weight percent) 2,5-dimethyl-2,5-di(t-butylperoxy)hexyne-3 (Lupersol 130 from Lucidol as a peroxy crosslinking agent); an ultraviolet light stabilizer, 0.25 pounds (0.49 weight percent) 2-hydroxy-4-n-octoxybenzophenone (UV 531 from American Cyanamid) as an ultraviolet light stabilizer and 0.02 pounds (0.0395 weight percent) dilauryl thiodipropionate (DLTDP from Evans Chemetics) as another stabilizer. The term weight percent describes the percent by weight of the total composition represented by the individual ingredient. The blender was turned on for a few minutes for thorough mixing. The mixture was then extruded at about 105° C. through a single screw Davis extruder, cooled in water and pelletized. Pellets were then ground to a particle size sufficiently small to pass a 35 mesh Tyler screen prior to rotational molding. About 8 pounds of the ground mixture was placed in a McNeil Akron Rotocast rotational mold, Model No. 800-64 designed to mold heavy wall plastic pipe 22 inches in length by 4 inches OD, wall thickness 0.75 to 1.0 inch. The mold was heated to 260° C., held at 260° C. for 10 minutes, while rotating it, cooled to ambient room temperature and the pipe removed. Examination of the internal pipe surface revealed 7 bubbles, each about 0.125 inch in diameter. Bubbles within the sample were present but were not counted.

EXAMPLE II

The procedure described in Example I was repeated except that initially fluff polyethylene, instead of polyethylene pellets, was used for blending and molding.

The term "initially fluff" polyethylene refers to polymeric material which has been obtained as polymerization reaction product from a polymerization reaction train or reactor means. Initially fluff starting material is thus material which has not been subject to pelleting or other shaping processes. In this Example, the peroxy crosslinking agent and stabilizers used in Example I above were admixed with initially fluff polyethylene. The resulting mixture was then pelletized and ground prior to rotomolding. After the pipe was removed from the mold, examination of the pipe sample revealed more than 50 bubbles on the internal surface of the pipe sample.

EXAMPLE III

In this example, the procedure described in Examples I and II was repeated except that a metal oxide was added to the molding composition. This example demonstrates that when a metal oxide is incorporated into the molding composition, the formation of bubbles is greatly reduced or in some cases eliminated. In this example, 0.5 pounds (0.98 weight percent) calcium oxide power (reagent grade, Mallinckrodt) was added to the polyethylene-based molding composition of examples I and II. After rotational molding as described, the internal portion of the pipe samples did not contain any surface bubbles of any size. Regardless of whether the polyethylene was in fluff or pellet form initially, the pipe samples did not contain any surface bubbles. The presence of a metal oxide such as calcium oxide in the molding composition and molding process thus can eliminate the formation of bubbles.

EXAMPLE IV

In this example, non-anhydrous zinc oxide was tested in a polyethylene resin molding composition. The zinc oxide did not reduce bubble formation. It is felt that the presence of moisture was a contributing factor to the presence of bubbles in the molded sample. It is felt also that anhydrous, dried zinc oxide would reduce formation of bubbles in the molded sample.

EXAMPLE V

This example describes the effect on physical properties of a molded article prepared according to this invention. The presence of 0.98 weight percent calcium oxide in a polyethylene-based molding composition of Example I was studied.

A. Impact Strength

Impact strength was determined from samples cut from rotationally molded boxes, 16"×16"×16" having a wall thickness of 0.125" and from rotationally molded pipe as described in Examples I through III. The tests were made in accordance with a modified falling dart method ASTM D 3029-78 using a 4"×4" plate and using a 2-pound weight. Comparison of samples with and without calcium oxide is shown in Table II below.

The data show that calcium oxide advantageously slows the increase in impact strength of the crosslinked polyethylene. The samples with calcium oxide have a lower impact strength than samples without calcium oxide when both are cured, for example, for 10 minutes. This can be advantageous in certain molding applications wherein it is desired to have a greater flow of the molding composition into an extremity of a mold used to produce a molded article having finely sized projections. More importantly, the data show that molded articles containing a metal oxide such as calcium oxide can possess impact strengths equal to molded articles without a metal oxide if the metal oxide containing samples are cured for a normal cure cycle.

TABLE II

Effect of Calcium Oxide on the Cure Time and Impact Strength of Molded Polyethylene

| Cure Time, mins. | Impact Strength, Foot-pounds | |
|---|---|---|
| | No. 1 0.98 Wt. % CaO | No. 2 0 Wt % CaO |
| 0.125 inch wall thickness (box molded at 315° C.) | | |
| 9 | 20 | 65 |
| 10 | 30 | 60 |
| 11 | 20 | 65 |
| 12 | 55 | 70 |
| 13 | 70 | 70 |
| 0.250 inch wall thickness (pipe) | | |
| 14 | 70 | >130 |
| 15 | 70 | >130 |
| 16 | 70 | >130 |
| 17 | 110 | >130 |
| 19 | 130 | >130 |

B. Flexural Modulus

Flexural modulus strengths were determined on samples molded at 210° C. for a 14-minute cure cycle in accordance with test method ASTM D 790. Samples having compositions of Examples I–III were prepared containing no metal oxide and containing a metal oxide. The flexural modulus of a molded sample having no metal oxide was 515 kPa. The flexural modulus of a molded sample containing 0.98 weight percent calcium oxide was 620 kPa. Thus, the presence of a metal oxide such as calcium oxide in a molded article can increase the flexural strength and improve the stiffness.

EXAMPLE VI

Example I was substantially repeated using a variety of Group II metals. The results are presented in the following table.

| | Control | BeO | MgO | CaO | BaO | ZnO |
|---|---|---|---|---|---|---|
| Group II Metal Oxide, wt. % | 0 | 1 | 1 | 1 | 1 | 1 |
| Lupersol 130-peroxide, wt. % | 0.65 | 0.65 | 0.65 | 0.65 | 0.65 | 0.65 |
| Bubbles/part | 8 | 0 | 0 | 0 | 0 | 0 |
| Gel test, wt. % (amt. of crosslinking) | 74.3 | 36.1 | 71.4 | 67.7 | 53.3 | 74.3 |

These laboratory tests indicate that the addition of a Group II metal oxide prevents bubbling during crosslinking of a solution form resin. With the exception of the BeO containing sample, no significant change was observed between the control and metal oxide containing samples.

Reasonable variations and modifications which will become apparent to those skilled in the art can be made in this invention without departing from the spirit and scope thereof.

What is claimed is:

1. A composition of matter having substantially no bubble formation when molded, said composition comprising:
   (a) a polymer selected from the group consisting of homopolymers and copolymers of ethylene, said polymer being one that has been produced by a solution polymerization process using a chromium containing polymerization catalyst,
   (b) an acetylene peroxy compound, and
   (c) a metal oxide selected from the group of oxides of metals of Group IIA and IIB of the Periodic Table.

2. A composition of matter in accordance with claim 1 wherein said polymer is a copolymer of ethylene and one or more acyclic mono-1-olefin hydrocarbons having 3 to 10 carbon atoms per molecule.

3. A composition of matter in accordance with claim 1 wherein said metal oxide is present in a concentration of about 0.1 to about 1 parts by weight metal oxide per hundred parts by weight polymer.

4. A composition of matter in accordance with claim 1 wherein the metal oxide is selected from the group consisting of CaO, BaO, MgO, and ZnO.

5. A composition of matter in accordance with claim 1 wherein the particle size of the metal oxide is less than 250 microns.

6. A composition of matter in accordance with claim 1 wherein said acetylenic peroxy compound is 2,5-dimethyl-2,5-di(tert-butyl peroxy) hexyne-3.

7. A composition of matter in accordance with claim 1 wherein the acetylenic peroxy compound is present in a concentration in the range of about 0.01 to 2.0 parts by weight acetylenic peroxy compound per 100 parts by weight polymer.

8. A composition of matter in accordance with claim 1 wherein the weight ratio of metal oxide to acetylenic peroxy compound is in the range of about 0.005 to 400.

9. A composition of matter in accordance with claim 1 further comprising a stabilizer.

10. A composition of matter in accordance with claim 9 wherein said stabilizer is dilauryl thiodipropionate.

11. A composition of matter in accordance with claim 9 wherein said stabilizer is 2-hydroxy-4-n-octoxybenzophenone.

12. A method of molding articles having a reduced content of bubbles, which method comprises molding a composition of matter comprising:
(a) a substantially solid polymeric material selected from the group consisting of homopolymers and copolymers of ethylene, said polymer being one that has been produced by a solution polymerization process using a chromium containing polymerization catalyst,
(b) a peroxy additive, and
(c) a metal oxide selected from the group of oxides of metals of Group IIA and IIB of the Periodic Table.

13. A method in accordance with claim 12 wherein said substantially solid polymeric material is a copolymer of ethylene and one or more acyclic mono-1-olefin hydrocarbons having 3 to 10 carbon atoms per molecule.

14. A method in accordance with claim 12 wherein said peroxy additive is a peroxy crosslinking agent having at least one acetylenic unsaturation and one or more peroxy groups.

15. A method in accordance with claim 12 wherein said metal oxide is present in a concentration of about 0.1 to about 1.0 parts by weight metal oxide to 100 parts by weight of said substantially solid polymeric material.

16. A method in accordance with claim 12 wherein said metal oxide is selected from the group consisting of CaO, BaO, MgO, and ZnO.

17. A method in accordance with claim 12 wherein the particle size of the metal oxide is less than 250 microns.

18. A method in accordance with claim 14 wherein said peroxy additive is 2,5-dimethyl-2,5,di(tertiary-butyl peroxy) hexyne-3.

19. A method in accordance with claim 14 wherein a stabilizer is present in the composition which is molded.

20. A method in accordance with claim 14 wherein said molding is rotational molding.

21. An article of manufacture molded in accordance with the method of claim 12.

22. An article of manufacture molded in accordance with the method of claim 19.

* * * * *